United States Patent [19]
Horii et al.

[11] Patent Number: 5,188,868
[45] Date of Patent: Feb. 23, 1993

[54] METHOD FOR COATING SURFACES OF A POWDERED MATERIAL BY DIRECTING COATING MATERIAL INTO COANDA SPIRAL FLOW OF POWDERED MATERIAL

[75] Inventors: Kiyoshi Horii, Tokyo; Hiroaki Sawazaki, Fukui, both of Japan

[73] Assignee: Fukuvi Chemical Industry Co., Ltd., Fukui, Japan

[21] Appl. No.: 579,323

[22] Filed: Sep. 10, 1990

[30] Foreign Application Priority Data

Dec. 28, 1989 [JP] Japan .................... 1-342347

[51] Int. Cl.$^5$ .............................. B05D 7/00
[52] U.S. Cl. ..................... 427/212; 118/303; 137/808; 239/427.3; 239/DIG. 7; 427/421
[58] Field of Search ............. 427/212, 421; 406/92, 406/194; 137/808, 809, 888, 889; 118/303; 239/427.3, 427.5, DIG. 7; 417/194, 197

[56] References Cited

U.S. PATENT DOCUMENTS

| 4,684,296 | 8/1987 | Horii et al. | 406/194 |
| 4,721,126 | 1/1988 | Horii | 137/1 |
| 4,762,148 | 8/1988 | Marui et al. | 406/194 |
| 4,969,481 | 11/1990 | Horii | 137/813 |

FOREIGN PATENT DOCUMENTS

| 62-258924 | 11/1987 | Japan | 239/DIG. 7 |
| 63-150500 | 6/1988 | Japan . | |
| 63-154522 | 6/1988 | Japan | 406/92 |
| 63-262339 | 10/1988 | Japan . | |
| 1-64918 | 10/1989 | Japan . | |

Primary Examiner—Michael Lusignan
Assistant Examiner—Terry J. Owens
Attorney, Agent, or Firm—Wenderoth, Lind & Ponack

[57] ABSTRACT

A method for coating surfaces of a powdered material includes forming a Coanda flow of a Coanda spiral flow of a powdered material by flowing the powdered material through a Coanda spiral flow forming passage or a Coanda flow forming passage by introducing a pressurized gas into the flow forming passage through a Coanda slit therearound, supplying the thus formed Coanda flow or Coanda spiral flow of powdered material into a further Coanda spiral flow forming passage, and atomizing a liquid coating material with a liquid gas and then directing the atomized liquid coating material into the Coanda flow or Coanda spiral flow of powdered material through a Coanda slit in the further Coanda spiral flow forming passage.

2 Claims, 3 Drawing Sheets

METHOD FOR COATING SURFACES OF A POWDERED MATERIAL BY DIRECTING COATING MATERIAL INTO COANDA SPIRAL FLOW OF POWDERED MATERIAL

FIELD OF THE INVENTION

The present invention relates generally to a method for coating surfaces of a powdered material and a device therefor. More specifically, it relates to a new method for coating surfaces of a powdered material evenly and at high efficiency, and a device therefor.

DESCRIPTION OF THE PRIOR ART

Conventionally, a surface coating of a powdered material has been performed in various fields, and it has been carried out by various means that form functional coating layers or protective layers on the surfaces of a particle, a pellet or a fine fiber.

For instance, a method for coating surfaces of a powdered material by the use of a mixer having agitating blades, or for coating them by bursting a powdered material and a coating material using a jet flow has been conventionally known.

However, in the conventional methods, it has been found to be very difficult to apply desired coatings on the surfaces of a powdered material in a micron or submicron order. It is difficult to apply a desired coating on the surfaces of an individual particle without any aggregation of the fine powdered material and damage. This is attributable to the tendency of a fine powdered material to form an aggregate mass due to secondary coagulation and to become broken due to mechanical forced mixing.

Furthermore, in the conventional methods, since a powdered material and a coating material tend to adhere onto the wall of a coating device during the surface coating, there has been a limit to the improvement of productivity of a coated powdered material.

The present invention has as an object to provide a new surface coating method for preventing the coagulation and breakage of even a fine powdered material in micron or submicron order and also preventing adhesion onto the wall surface of a coating device, and for providing an even and highly efficient surface coating, and a device therefor.

Other objects, characteristic features and benefits of the present invention will become clear by reading through the detailed description with reference to the attached drawings.

DETAILED DESCRIPTION OF THE INVENTION

In the present invention, there are no specific limitations to the kind and shape of the particles of the powdered material to which the invention can be applied. Metals, inorganic substances, polymers or other materials in the shape of particles, pellets, short fibers or other shapes can be coated. As for the size, a fine powdered material in micron and submicron sizes can also be applied. The present invention, in particular, is useful for the surface coating of a fine short fabric powdered material.

As for the coating material, anything that can be used as a liquid coating material can be employed. By both physical coating and reactive coating methods, surfaces of a powdered material can be coated. An appropriate coating manner can be adopted depending on the purposes, i.e., the reforming, protection of the surfaces of a powdered material, or provision of new functions.

The present invention has been established as process technology by using the above described powdered material and coating material and making use of fluid phenomena with Coanda flow and also Coanda spiral flow that have been investigated by the inventors of the present invention.

A Coanda flow is characterized by a vast difference in velocity and density between the axial flow of a fluid and the flow around the axial flow, and by a formation of a dynamic boundary region near the conduit wall. A Coanda spiral flow developed from this Coanda flow is formed as a specific spiral flow in which the axial vector and radial vector are synthesized.

The present invention is described in more detail with reference to the attached drawings and the embodiments.

Figure 1:
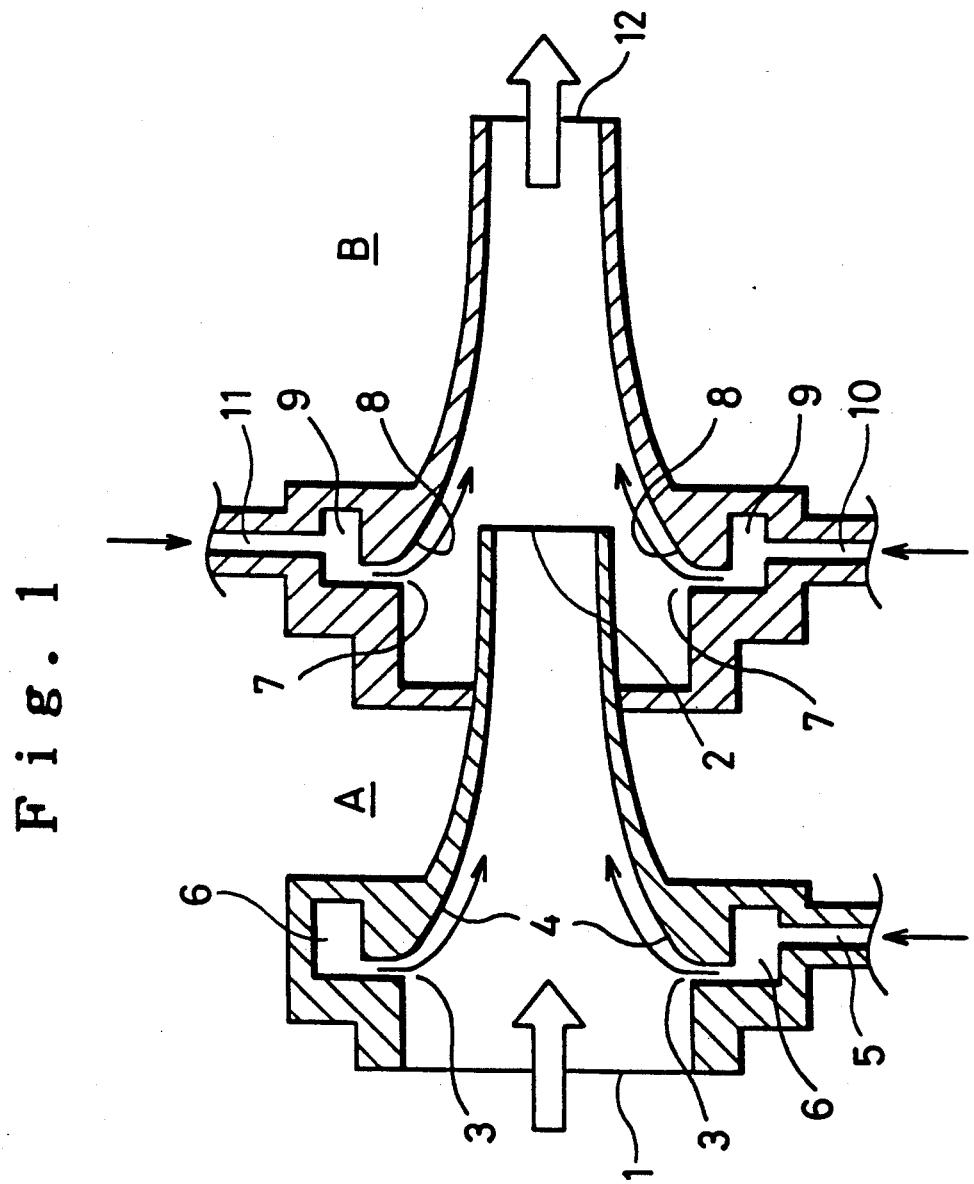
FIG. 1 is a cross sectional view of an embodiment of a device of the present invention.
Figure 2:
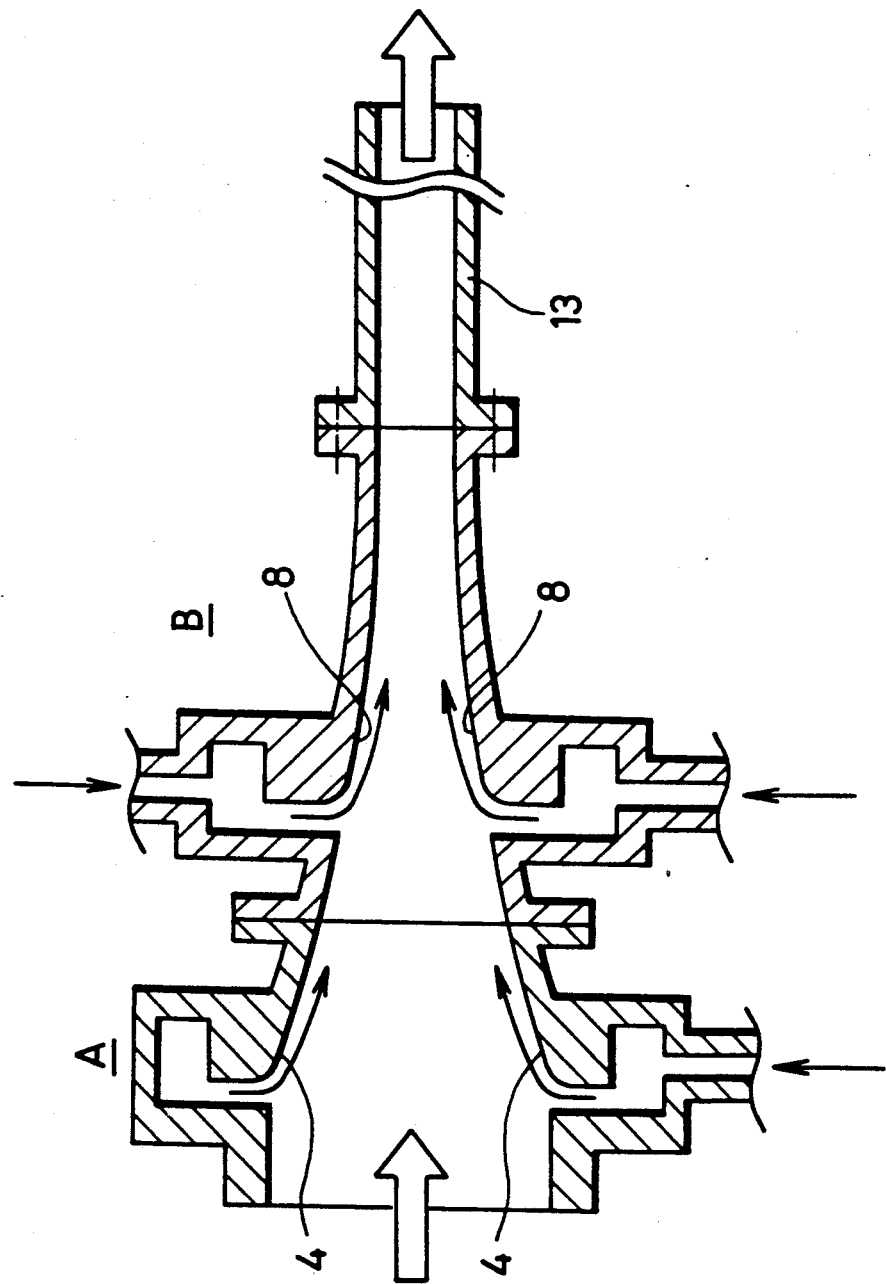
FIG. 2 is a cross sectional view of another embodiment of a device of the present invention.
Figure 3:
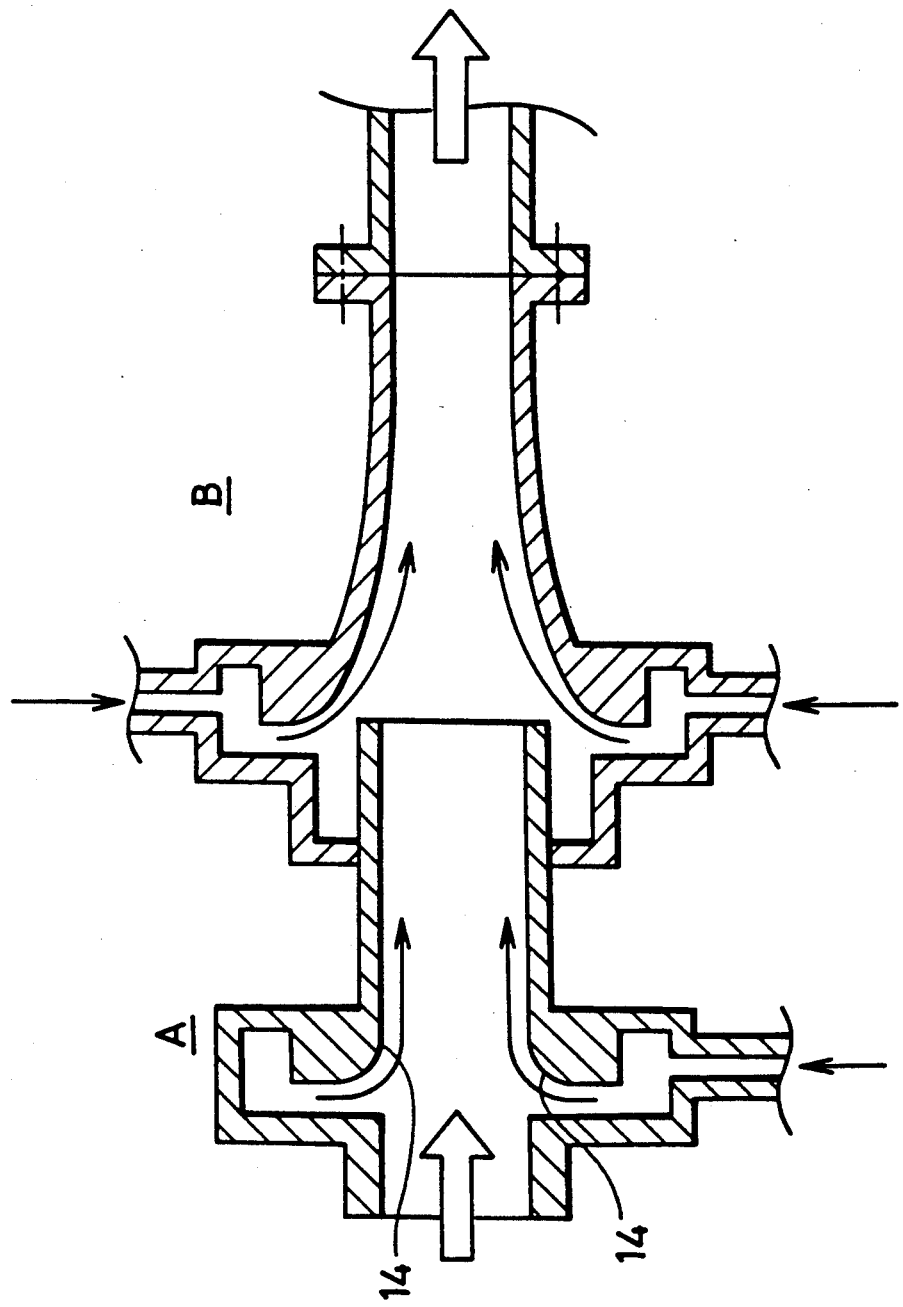
FIG. 3 is a cross sectional view of a further embodiment of a device of the present invention.

For instance, as shown in FIG. 1, a device for coating surfaces according to a powdered material of the present invention has a composite structure in which unit (A) and a unit (B) are linked. These units (A) and (B) are either integral or separate in construction. In either case, they can be considered to be connected in terms of function.

The unit (A) constitutes an inlet portion for a powdered material by a Coanda spiral flow. This unit (A) comprises a supply port (1) and a discharge port (2) connected by a flow passage, an annular Coanda slit (3) for the introduction of pressurized gas into the flow passage in the lateral direction, a curved inclined surface (4) of the flow passage in the vicinity of said Coanda slit (3), a supply pipe for pressurized gas (5), and a distribution portion (6).

A powdered material to be coated is introduced through the supply port (1) and conveyed to the unit (B) by pressurized gas introduced through the Coanda slit (3). The pressurized gas forms a Coanda flow along the curved inclined surface (4), and in this example, a spiral motion is generated in the flow of powdered materials.

The unit (B) has an annular Coanda slit (7) through which a liquid coating material is atomized by pressurized gas as diffusing gas is blown into the part of the flow passage thereof having; a curved inclined surface (8), and a distribution portion (9), and is provided with a pressurized gas supply pipe (10) and a liquid supply pipe (11) to generate and supply a mist of a liquid coating material.

In the unit (B), a mist of a liquid coating material formed by a mixture of pressurized gas and a liquid coating material is blown from the Coanda slit (7) into the flow passage for a powdered material, the surfaces of the powdered material are coated with the coating material, and the coated powdered material is discharged from the discharge outlet (12).

As the pressurized gas to be blown from the Coanda slits (3) and (7) of the units (A) and (B), any gas such as air, inert gas and reactive gas can be employed, and can be selected depending on the kinds and physical properties of the powdered material and the coating material, the characteristics of the coating to be processed and the difference between physical and reactive coating. The pressure of the pressurized gas can be in the range between 1 and 10 kg/cm$^2$ or greater, and can be set freely depending on the amount of a powdered material to be introduced, flow velocity, or the amount and velocity of an atomized coating material to be blown.

The solid/gas ratio can also be selected from among wide ranges.

The angle of incline the curved inclined surfaces (4) and (8) of the units (A) and (B) is widely variable, and can be set to a value which permits a Coanda flow, a Coanda spiral flow particularly in this example, to generate and be maintained so that it cannot be broken, i.e., 20° to 70°.

In a device and a method for coating surfaces of a powdered material using the device of the present invention, a construction comprising the units (A) and (B) is essential. The unit (A) is indispensable to enable control of the secondary coagulation of a powdered material, promote diffusion and generate an orientation particularly important to a short fiber. In order to diffuse and bring a coating material into contact with the well-diffused powdered material and permit even and highly efficient coating, the unit (B) is essential. In addition, the unit (B) is also important because it has a drying function.

To improve coating efficiency, provide the desired physical property and convey the coated powdered material, the length of the curved inclined surface (8) from the Coanda slit (3) to the discharge outlet (12) of the unit (B) can be a suitable length. The discharge outlet (12) can be connected to the conduit for transporting the coated material.

A liquid coating material may be mixed and generated in the distribution portion (9) or a pre-mixed gas/-liquid mixture may be caused to bl